Patented Oct. 13, 1936

2,057,025

UNITED STATES PATENT OFFICE 2,057,025

PRODUCTION OF FERTILIZERS

Jacob Frederick Carl Hagens and Ludwig Rosenstein, San Francisco, and Wilhelm Hirschkind, Berkeley, Calif., assignors to The Barrett Company, New York, N. Y., a corporation of New Jersey No Drawing. Original application August 10, 1928, Serial No. 298,868, now Patent No. 1,967,205, dated July 17, 1934, which in turn is a division of Serial No. 190,960, May 12, 1927, now Patent No. 1,699,393, dated January 15, 1929. Divided and this application March 7, 1933, Serial No. 659,982. In Great Britain May 5, 1927

1 Claim. (Cl. 71—41)

This invention relates to a process for the production of fertilizers containing dicalcium phosphate and ammonium sulfate from phosphoric acid (or its calcium acid salts), calcium sulfate and ammonia.

This case is a division of our application Serial No. 298,868, filed August 10, 1928, which has matured into United States Patent No. 1,967,205 of July 17, 1934. Application Serial No. 298,868 is a division of our application Serial No. 190,960, filed May 12, 1927, issued as United States Patent No. 1,699,393 of January 15, 1929.

The products which result from this process, namely dicalcium phosphate and ammonium sulfate, are each valuable fertilizing materials in themselves and the mixture of these two substances as produced by our process is especially valuable because of the intimacy of the association. They each have uses other than as fertilizing materials. Thus, for example, pure dicalcium phosphate is readily transformed by phosphoric acid into monocalcium phosphate which is a common ingredient of baking powders; ammonium sulfate, besides being used as a fertilizer ingredient, also enters into the production of ammonium nitrate and other ammonium products. They are readily separated by taking advantage of the fact that dicalcium phosphate is insoluble while ammonium sulfate is readily soluble in water.

Dicalcium phosphate is referred to in the fertilizer trade as "citrate soluble phosphate" and the term will be used hereafter in this sense.

The process to be described produces a material which may be used directly as a fertilizer or as an ingredient in mixed fertilizers; or the constituents thereof may be separated by dissolving the ammonium sulfate with water and crystallizing it.

This invention is based on the discovery that a reaction between phosphoric acid, gypsum and ammonia occurs under the proper conditions to produce the above named products. The reaction may be written as follows:

I. $H_3PO_4 + CaSO_4 + 2NH_3 = CaHPO_4 + (NH_4)_2SO_4$

We have found that this reaction proceeds rapidly and smoothly to completion. Its rate is greatly increased by the presence of a certain amount of water and we, therefore, prefer to operate the process with commercial 80% phosphoric acid and calcium sulfate which contains its usual two molecules of water of crystallization, but we in no wise limit our invention to the exclusive use of these materials.

The dicalcium phosphate produced by this process is still capable of reacting with further quantities of calcium sulfate and ammonia to form tricalcium phosphate and a further quantity of ammonium sulfate, as shown by the following reaction:

II. $2CaHPO_4 + CaSO_4 + 2NH_3 =$
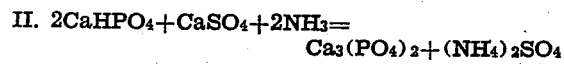
$Ca_3(PO_4)_2 + (NH_4)_2SO_4$ but as tricalcium phosphate is generally considered undesirable for fertilizer purposes and also is not as economical for other uses as dicalcium phosphate, our invention includes the limitation of conditions so that reaction I preponderates and reaction II will be substantially excluded. This we accomplish by either:

(a) Discontinuing the introduction of ammonia when substantially two molecular weights thereof have been absorbed for each molecular weight of phosphoric acid; or, (b) By mixing the calcium sulfate and phosphoric acid in such proportions that there is substantially one molecular weight of phosphoric acid to each molecular weight of calcium sulfate.

As before indicated when these conditions are maintained reaction II is practically excluded.

Referring back to reaction I, this may be considered as taking place in two stages. The first being neutralization of phosphoric acid by ammonia which may be written as follows:

IA. $H_3PO_4 + 2NH_3 = (NH_4)_2HPO_4$
(di-ammonium-hydrogen phosphate).

Secondly, a reaction between di-ammonium-hydrogen phosphate with calcium sulfate, which may be written IB. $(NH_4)_2HPO_4 + CaSO_4 = CaHPO_4 + (NH_4)_2SO_4$
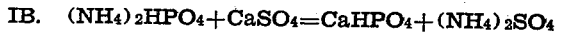

and as a matter of fact our process may be carried out in two steps. First neutralizing phosphoric acid with ammonia to produce solid di-ammonium-hydrogen phosphate and then bringing the latter solid compound into intimate contact with solid gypsum. Reaction IB will then take place, especially if a small amount of water be added to catalyze it.

Certain of the calcium acid salts of phosphoric acid, more especially monocalcium phosphate, will react similarly to phosphoric acid and may be substituted for it provided the limitations mentioned in the previous paragraph are adhered to so that the formation of tricalcium phosphate is avoided. The reaction with monocalcium phosphate is then as follows:

III. 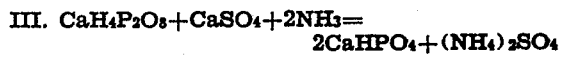

Ordinary commercial acid phosphate is a mixture containing monocalcium phosphate and calcium sulfate in such proportions that there are present approximately two molecular weights of calcium sulfate to each molecular weight of water soluble $P_2O_5$ and ordinarily contains but a small amount of free acid. Therefore, when commercial acid phosphate is to be used in this process it must first be mixed with the proper amount of phosphoric acid or material containing a high percent of water soluble $P_2O_5$; or it may be used as commercially produced provided the absorption of ammonia be stopped when substantially two molecular weights of ammonia have been absorbed for each molecular weight of water soluble $P_2O_5$.

A mixture especially suited for the above described process is produced by treating raw phosphate rock or bone phosphate with a mixture of phosphoric acid and sulfuric acid in such proportions that in the final product the molecular ratio of water soluble $P_2O_5$ and calcium sulfate shall be one to one. In this case the reaction that takes place is as follows:

IV. 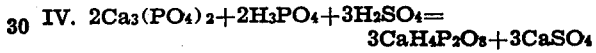

When reaction I takes place heat is liberated. Since it is undesirable to allow the mixture to get too hot, provisions must be made for removing such heat by proper cooling methods in those cases where undue heat is generated. It is also highly desirable to keep the reacting mixture in a state of agitation during the reaction particularly when treating commercial acid phosphate material with liquid anhydrous ammonia, but as types of equipment for carrying on the reaction are not within the scope of the present invention, means of effecting cooling and agitation will not be further described. By providing for agitation of the reacting mixture during ammoniation, absorption of the ammonia is made possible with no material loss of ammonia, or localized overheating of the mass even when the ammonia is supplied as liquid anhydrous ammonia.

The ammonia which enters into this reaction may be supplied either as pure gas, as diluted gas or as liquid anhydrous ammonia. We prefer to work with ammonia as a diluted and humidified gas carrying an amount of inert gas sufficient, or nearly sufficient, to carry off the heat of the reaction.

We claim:

The process of making fertilizer consisting in mixing a ground solid superphosphate, a substantial amount of phosphoric acid, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

JACOB FREDERICK CARL HAGENS.
LUDWIG ROSENSTEIN.
WILHELM HIRSCHKIND.